US009213809B2

United States Patent
Lindquist et al.

(10) Patent No.: US 9,213,809 B2
(45) Date of Patent: Dec. 15, 2015

(54) SYSTEM AND METHOD FOR PROTECTING DIGITAL CONTENTS WITH DIGITAL RIGHTS MANAGEMENT (DRM)

(75) Inventors: Johan Lindquist, Cape Canaveral, FL (US); Guido Domenici, Amsterdam (NL); Audrius Idzelis, Amsterdam (NL)

(73) Assignee: INSIDE SECURE, Meyreuil (FR)

( * ) Notice: Subject to any disclaimer, the term of this patent is extended or adjusted under 35 U.S.C. 154(b) by 246 days.

(21) Appl. No.: 14/115,013

(22) PCT Filed: Apr. 23, 2012

(86) PCT No.: PCT/US2012/034644
§ 371 (c)(1),
(2), (4) Date: Oct. 31, 2013

(87) PCT Pub. No.: WO2012/151067
PCT Pub. Date: Nov. 8, 2012

(65) Prior Publication Data
US 2014/0068264 A1 Mar. 6, 2014

Related U.S. Application Data

(63) Continuation of application No. 13/099,099, filed on May 2, 2011, now abandoned.

(51) Int. Cl.
*G06F 21/10* (2013.01)
*H04L 29/06* (2006.01)

(52) U.S. Cl.
CPC ............ *G06F 21/10* (2013.01); *H04L 63/0428* (2013.01)

(58) Field of Classification Search
CPC ...................................................... G06F 21/10
See application file for complete search history.

(56) References Cited

U.S. PATENT DOCUMENTS 7,028,096 B1    4/2006  Lee
7,840,489 B2   11/2010  Candelore
(Continued)

FOREIGN PATENT DOCUMENTS

EP    1107137    6/2001
EP    2241994   10/2010
(Continued)

OTHER PUBLICATIONS

Liu et al.; Digital rights management for content distribution; Published in: Proceeding ACSW Frontiers '03 Proceedings of the Australasian information security workshop conference on ACSW frontiers 2003—vol. 21; pp. 49-58; Australian Computer Society; ACM Digital Library.*

(Continued)

*Primary Examiner* — Bradley Holder
(74) *Attorney, Agent, or Firm* — Allen, Dyer, Doppelt, Milbrath & Gilchrist, P.A.

(57) ABSTRACT

An approach for protecting digital contents includes a content delivery phase wherein a client stores digital contents or retrieves them in streaming, transmits to a user device the digital content in a protected format along with an enabling code for enabling the user device to access or read the protected digital content. The approach includes a key generation phase in a DRM (Digital Right Management) server which derives at least one key for encrypting the digital contents. A key transmission phase involves the derived key being transmitted from the DRM server to the client. For decrypting the digital content, the user device requests the key from the DRM server, with the request including a key identification defined by the enabling code transmitted by the client to the user device which is used by the DRM server to derive the key for the user device.

14 Claims, 10 Drawing Sheets

(56) References Cited

U.S. PATENT DOCUMENTS

| | | | |
|---|---|---|---|
| 8,369,528 | B2 | 2/2013 | Kwak et al. |
| 8,386,799 | B2 | 2/2013 | Kim et al. |
| 2002/0013772 | A1* | 1/2002 | Peinado .................. G06F 21/10 705/51 |
| 2003/0078891 | A1 | 4/2003 | Capitant |
| 2004/0064714 | A1 | 4/2004 | Carr |
| 2004/0158712 | A1 | 8/2004 | Lee et al. |
| 2004/0264489 | A1 | 12/2004 | Klemets et al. |
| 2005/0027871 | A1 | 2/2005 | Bradley et al. |
| 2005/0094810 | A1 | 5/2005 | Kuan et al. |
| 2006/0083369 | A1* | 4/2006 | Lee .......................... H04L 9/085 380/28 |
| 2006/0106726 | A1 | 5/2006 | Raley et al. |
| 2006/0107046 | A1 | 5/2006 | Raley et al. |
| 2006/0149961 | A1 | 7/2006 | Park et al. |
| 2006/0265333 | A1 | 11/2006 | Gomes et al. |
| 2007/0005506 | A1* | 1/2007 | Candelore ............... G06Q 99/00 705/59 |
| 2007/0130076 | A1 | 6/2007 | Park et al. |
| 2007/0156601 | A1 | 7/2007 | Brew et al. |
| 2007/0180519 | A1* | 8/2007 | Boccon-Gibod ........ G06F 21/10 726/21 |
| 2007/0219909 | A1* | 9/2007 | Hardacker ............... G06F 21/10 705/51 |
| 2007/0220610 | A1* | 9/2007 | Van Loenen ............ G06F 21/10 726/26 |
| 2008/0005348 | A1 | 1/2008 | Kosiba et al. |
| 2008/0010450 | A1 | 1/2008 | Holtzman et al. |
| 2008/0056500 | A1 | 3/2008 | Bradley et al. |
| 2008/0097775 | A1 | 4/2008 | Kim |
| 2008/0114992 | A1 | 5/2008 | Robert et al. |
| 2008/0148414 | A1* | 6/2008 | Tom ......................... G06F 21/10 726/29 |
| 2008/0192711 | A1 | 8/2008 | Balachandran et al. |
| 2009/0083431 | A1 | 3/2009 | Balachandran et al. |
| 2009/0122991 | A1* | 5/2009 | Kwak ....................... G06F 21/10 380/278 |
| 2009/0199303 | A1* | 8/2009 | Ahn ......................... G06F 21/10 726/27 |
| 2010/0054479 | A1* | 3/2010 | Kao ......................... G06F 21/10 380/279 |
| 2010/0138671 | A1 | 6/2010 | Kim et al. |
| 2010/0205318 | A1 | 8/2010 | Melnyk et al. |
| 2010/0257356 | A1* | 10/2010 | Greevenbosch ........ G06F 21/10 713/155 |
| 2011/0191812 | A1 | 8/2011 | Cory et al. |
| 2012/0254365 | A1 | 10/2012 | Adimatyam et al. |
| 2012/0265892 | A1 | 10/2012 | Ma et al. |

FOREIGN PATENT DOCUMENTS

| | | |
|---|---|---|
| WO | 0152019 | 7/2001 |
| WO | 2007047846 | 4/2007 |
| WO | 2008030055 | 3/2008 |

OTHER PUBLICATIONS

Subramanya et al.; Digital rights management; Published in: Potentials, IEEE (vol. 25, Issue: 2); pp. 31-34; Date of Publication: Mar.-Apr. 2006; IEEE Xplore.*

"White Paper: The Media Key Potential", pp. 1-10, MEDIAKEY™, 2011, Available at http://www.mediakey.com/the%20mediakey%20potential.pdf, 1-10.

Marlin Developer Community, "Marlin Simple Secure Streaming (MS3)", http://www.marlin-communicty.com/files/MDC_MS3_whitepaper_100707.pdf, Jul. 2010, pp. 1-4.

Fecheyr-Lippens, "A Review of HTTP Live Streaming", Internet Citation, http://issuu.com/andruby/docs/http_live_streaming, Jan. 2010, pp. 1-37.

Sodagar, "The MPEG-Dash Standard for Multimedia Streaming Over the Internet", IEEE Multimedia, Vo. 18, No. 4, Apr. 2011, pp. 62-67.

Son et al., "Fast Required Bandwidth Estimation Technique for Netowrk Adaptive Streaming", IEEE Transactions on Consumer Electronics, vol. 56, No. 3, Aug. 2010, pp. 1442-1449.

* cited by examiner

SYSTEM AND METHOD FOR PROTECTING DIGITAL CONTENTS WITH DIGITAL RIGHTS MANAGEMENT (DRM)

FIELD OF THE INVENTION

The present application relates to a system and method for protecting digital contents with DRM. More particularly, the embodiments relate to an approach including a phase for delivering the contents from a client or content provider to a user device, the client storing the digital contents and codes for enabling or disabling the user device to read the protected digital contents, after delivery.

BACKGROUND OF THE INVENTION

Known approaches for protecting digital contents with DRM (Digital rights management) prevent unauthorized redistribution and restrict the ways a user can copy purchased content, thus limiting the piracy of commercially marketed digital material, which recently increased especially through the widespread use of peer-to-peer file exchange programs.

A known approach for protecting digital contents may be implemented by embedding a code in the digital content which prevents its copy to an unauthorized user device. Further protections may be provided, for example, by specifying a time period in which the content can be accessed or limiting the number of devices whereon the content can be installed or read. More particularly, a protected digital content and a code is transmitted from a client to a device of a user which purchases the content. The digital content is stored in the client or retrieved from the client in streaming from a network. When the user device receives the digital content in protected format, it decrypts such with the code.

A limitation of the above cited approach is that the client or content provided is responsible not only to deliver the digital content in protected format but also to implement the DRM, generating the code for the user device and storing it. In other words, the approach has a notable impact on the client. Moreover, this approach has a limitation of security because the code enabling the reading of the protected digital content is transmitted to the user device and is at last available to the user; in other words, the code is not consumed or destroyed after reading the protecting digital content in the user device and it remains available for the user.

It may be desired to reduce the impact of protecting digital contents on the client or content provider and to enforce the security of the DRM so that the code enabling the user device to read the digital content provider is not easily available at the user device side, thus overcoming the limitations of current approaches.

Different types of content services and common DRM problems in each type are discussed below.

In a rental service, the consumer purchases the right to use content for a fixed period of time. In a rental service like video on demand (VOD), the content lifetime is usually short (e.g. 24 hours) and the content is viewed on a single device. This may be the simplest type of service to implement in a consumer-friendly way.

In a subscription rental service, the consumer can access a substantial library of content. In a streaming video subscription service, for example, a subscriber may pay a monthly fee to access a variety of movies or TV programs. In a subscription rental service, consumers get access to content for a longer period of time so issues like the portability of the content (moving content between devices or accessing it multiple times on different devices), device upgrades and updates to the DRM technology may be considered. New licenses may be issued to subscribers to allow access for the next subscription period. This process should be as seamless as possible and not cause any disruption in accessing subscription content.

In a "purchase to own" model, the consumer purchases the right to consume the content for as long as desired. A common requirement in this type of service is the ability to backup content and licenses in case a device is damaged, stolen or upgraded. Upgrades of the DRM technology may also need to be handled so that new content can be purchased after the upgrade but previously purchased content can still be used. Consumers will often expect to access the content on multiple devices.

Some DRM content services only deliver content to one type of device. More commonly content distributors want to deliver content to a range of different devices, e.g. Android phones and iPhones. Multiple implementations of the same DRM technology are required for different devices and operating systems. The DRM client may be integrated with a media player, download manager, file system and other components on the device. As a result DRM clients are often installed on the device during manufacture or provisioning. A Microsoft Playready DRM client for example, may not be available on all the devices used by the content service's target consumers.

Also, many DRM technologies bind licenses to a particular device. This means that a new license must be issued to each device on which the consumer wants to play the content and it may be necessary to track the devices owned by a particular consumer.

Content can be downloaded or streamed. Streaming content is often only stored on the server side and not on the client device. This has the advantage that device upgrades or updates of the DRM technology may be less problematic since older DRM content may not have to be ported to a new device or DRM version.

Examples of content services and the typical DRM problems associated with them are set forth below.

Video on demand includes a service type involving rental, e.g. 24-hour access to films and TV programs. Content delivery involves download or streaming, and devices include PCs or connected TVs. This type of service has few DRM usability issues as long as DRM clients are available for all target device types.

"Unlimited" video subscription service includes a service type involving subscription rental and streaming content delivery. Devices include PCs, connected TVs, tablets and mobile phones. Making DRM clients available for all target device types may require additional development. Subscription renewal should be as transparent as possible and the user should not encounter any interruptions in content access. Features like license predelivery and silent license delivery facilitate "invisible" subscription renewal.

Video download to own is a purchase-to-own service type with content delivery that is downloaded. Devices include PCs, connected TVs, tablets and mobile phones. Content and licenses should be backed up on the server-side to allow users to move them when devices are lost or upgraded. When updating the DRM technology, older content must still be playable. In major upgrades, a new version of previously purchased content may need to be delivered to subscribers.

SUMMARY OF THE INVENTION

The approach of the present invention is to implement a DRM with a "client-server-user device" architecture wherein the encryption key, or keys, for protecting digital contents, is generated in a DRM server and transmitted to a client site or content provider which encrypts the contents before delivery to a user device. The client embeds also a code within the protected contents for the user device which is transmitted from such user device to the DRM server for retrieving the key(s) for decrypting the contents.

Advantageously, only the code is transmitted to the user device but the key is derived inside the DRM server for the user device. Moreover, each time the client transmits separately encrypted contents to the user device, a different code may be transmitted and a different key derived in the DRM server for decrypting the protected digital contents in the user device.

The client site includes a DRM batch protector module which is preferably programmed to encrypt the digital content offline. According to an aspect of the invention, the DRM server stores a SOAP API receiving from the DRM batch protector module an identification of the digital content and a number associated with the number of streams or segments in which the digital content is to be encrypted. The output of the SOAP API is at least one code for protecting the digital contents. In one embodiment of the invention, the code includes a key ID and a seed to be used inside the DRM batch protector module for deriving the content encryption key. In another embodiment, the SOAP API directly returns to the DRM batch protector module the content encryption key, which however is not stored in the DRM server. Preferably, the key ID, seed and content encryption key comply with at least one DRM protection system including, for example, "PlayReady", "Windows Media DRM" and "Apple HTTP Streaming". Further advantages and features of the approach according to the present invention will be apparent from the following description.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The dimensions of layers and regions may be exaggerated in the figures for greater clarity.

Figure 1:
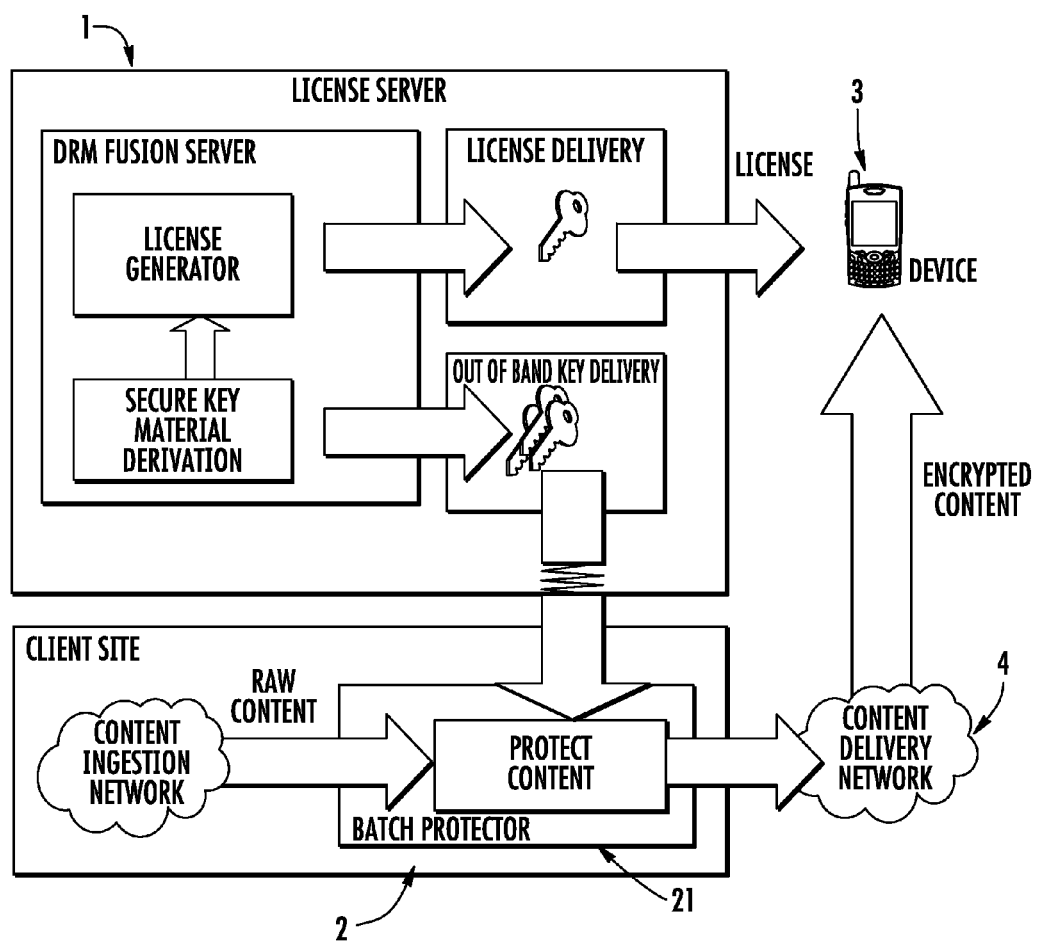
FIG. 1 is a block diagram illustrating components of a system and phases of the method according to the present invention.
Figure 2:
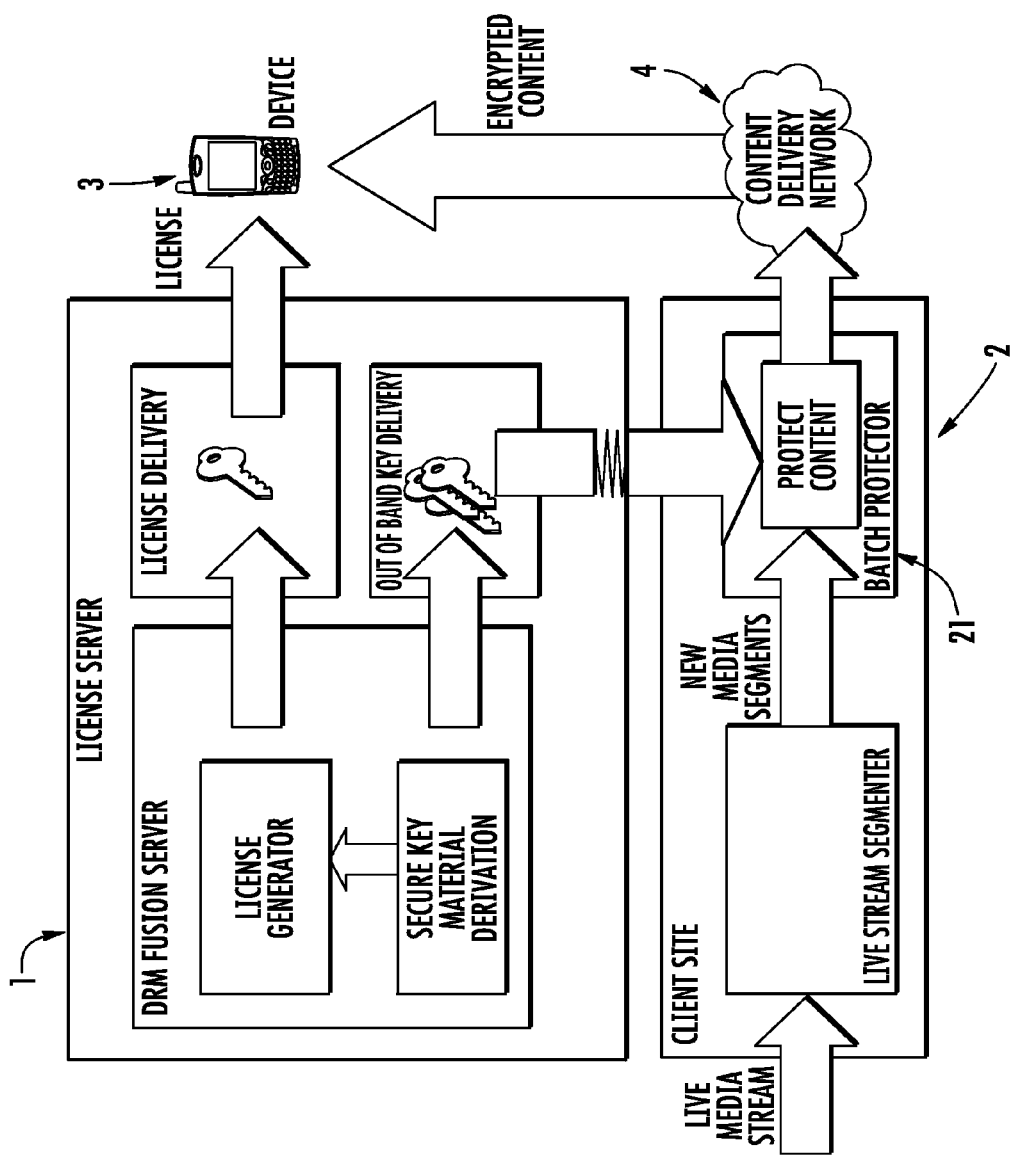
FIG. 2 is a block diagram illustrating components of a system and phases of the method according to another embodiment of the present invention.

With reference to FIGS. 1 and 2, it is schematically represented a system and method for protecting digital contents with DRM according to the present invention, wherein a client site 2 or a content provider is in communication with a user device 3 for transmitting digital contents in a protected format. Typically, the client site 2 stores the digital content (e.g. FIG. 1) or retrieves such in a streaming format from a network (FIG. 2).

By way of example, the user device 3 may be a cellular device that is capable of sending and receiving calls, messages, emails and data via a wireless (i.e., cellular) communications network. However, other types of wireless devices (and networks), such as wireless local area network (WLAN) devices, may also be used. Moreover, the user devices 3 may be enabled for communicating via more than one type of wireless network (e.g., via a cellular network and a WLAN).

According to the present invention, a DRM server 1 generates the key for the encryption process within the client site 2 and for the decryption process within the user device 3. More particularly, the approach includes the following phases. A key generation phase where the DRM server 1 derives at least one key for protecting the contents, a key transmission phase where the key is transmitted from the DRM server 1 to the client site 2, and a content delivery phase, where the client site 2 transmits the protected content to a user device 3.

For decrypting the digital content, the user device 3 requests the key(s) from the DRM server 1, the request may include a key identification that was transmitted by the client site 2 to the device 3 together with the protected contents and also used by the DRM server 1 to derive the key or keys for the device 3.

Advantageously, the key is provided by the DRM server 1 to the client site 2 and to the user device 3, and it is not transmitted between client site 2 and user device 3. Moreover, several keys may be generated in the DRM server 1 and transmitted to the client site 2 to encrypt "on the fly" corresponding several pieces of digital contents, e.g. the user device 3 may request several keys from the DRM server 1, for decrypting pieces of the protected digital content.

The execution of the key generation phase is requested from a DRM batch protector module 21 of the client site 2, before encrypting the digital contents. After receipt of the encryption keys from the DRM server 1, the DRM batch protector module 21 encrypts the digital contents, preferably offline. More particularly, the DRM batch protector module 21 reads the digital contents from a local directory or from a URL (Uniform Resource Locator) and retrieves the encryption keys from a KEY_FILE provided by the DRM server 1. Preferably, the KEY_FILE is password protected.

The key generation phase may comprise an execution of a SOAP (Simple Object Access Protocol) API (Application Programming Interface) which is stored inside the DRM server 1, and receives as an in input an identifier of the digital content to be encrypted, for example the title of a movie, and a Crypto Period Number (CPN) associated to a number of segments or streams in which the digital contents is divided. The output of the SOAP API is a plurality of encryption keys to be used for encrypting the digital content in a plurality of segments or streams.

The DRM batch protector module 21 transmits the CPN and the identifier of digital contents to the DRM server 1 and receives in response from the DRM server 1 the plurality of encryption keys. According to an aspect of the invention, an increased CPN is transmitted from the DRM batch protector module 21 to the DRM server 1, and further encryption keys may be received, to encrypt further segments or streams of data.

In this further request of encryption keys, the content identifier is not modified. Preferably, the CPN is an unsigned 64-bit integer used for key scheduling purposes, as different numbers, even with the same content identifier, to yield different content encryption keys.

According to a preferred embodiment, the DRM batch protector module 21 further transmits the type of DRM Protection System used for encrypting the digital contents; the type may include, for example, "PlayReady", "Windows Media DRM" and "Apple HTTP Streaming" as the DRM Protection System, or any other DRM system using symmetric keys for protection.

Hereafter are given some examples of the output or response from the DRM server 1 to the client site 2, i.e. to the DRM batch protector module 21, in case the DRM Protection System used is "PlayReady", "Windows Media DRM" and "Apple HTTP Streaming".

With PlayReady, the Key provisioning response may include: —a Key ID which is a 16-byte array including the identification of the content to PlayReady and to an Entitlement API which is queried by the user device, as is apparent from the description below. The Key ID is also part of the PlayReady protected header; —a Seed which is a byte array of at least 30 bytes including the seed used to generate the content key in combination with the Key ID; —a Content Encryption Key which is a 16-byte array used to AES-128 encrypt the contents. The Content Encryption Key may be deterministically calculated on the basis of Key ID and Seed but, as a preferred embodiment, it is specifically returned by the SOAP API.

With Windows Media DRM, the Key Provisioning Response may include: a Key ID which is a 16-byte array including the identification of the content to Windows Media DRM and to the Entitlement API, it is also part of the WMDRM protected header; and a Seed which is a byte array of at least 30 bytes including the seed used to generate the content key in combination with the Key ID.

With Apple HTTP Streaming, the Key Provisioning Response may include: a Key ID, i.e. a 16-byte array with the identifier of the content to the Entitlement API; and a Content Encryption Key, i.e. a 16-byte array comprising the AES key for encrypting the digital content.

Hereafter are examples of steps for transforming the external content identifier into Key ID, Seed and/or Content Encryption Key, according to an embodiment of the present invention:

1. A UTF-8 encoding of the content identifier, for example the identifier "The Family Guy, Season 2, Episode 6", is given as an input to a MD5 algorithm.
2. A UTF-8 encoding of a decimal representation of the Crypto number, for example "12345", is give in input to the same MD5 algorithm.
3. MD5 hash is calculated, returning as an output a 16-byte array which is the Key ID.
4. The Key ID is given as an input to a key manager table. A transformation turns any byte array into another 32-byte array by going through SHA-256 and a secret 64 KB "key table". The keyTable may be a 256-by-256 byte square matrix including pseudo-random numbers generated using a cryptographically strong random generator. This table is available to DRM server 1, for example in a local file. Turning the initial "contentID" of arbitrary length into a 32-byte array that can be used as a seed would be appreciated by those skilled in the art.
5. The Key ID and the Seed are given in input to an algorithm having in output the Content Encryption Key, preferably 16-bytes long.

As already stated, for PlayReady, at least Key ID and Seed are returned, and as for Windows Media. For Apple HTTP Streaming, Key ID and Content Encryption Key are returned.

According to the invention, a higher security of the DRM process is obtained avoiding the storage of the keys within the DRM server but deriving the key(s) through an internal server table and with a key identification.

Preferably, the transmission of key(s) between the DRM server 1 and the client site 2 is over a secure channel, more preferably out-of-band. Moreover, the transmission of keys between the DRM server 1 and the client site 2 is password protected.

In an aspect of the present invention, the transmission of protected contents from the client site 2 to the device 1 is streamed, each stream being separately encrypted before transmission with a different encryption key generated by the DRM server (e.g. as illustrated in FIG. 2).

In another aspect of the invention, the transmission of contents from the client site 2 to the device 3 is in a single block, previously stored in the client site 2. In this case, the digital content is already available locally in a storage of the client and is not retrieved from a network.

In a preferred embodiment of the invention, the key(s) is used only for one communication session between the DRM server 1 and the client site 2, and than marked as consumed or used. This embodiment improves security of the DRM. Also the user device 3 consumes the key(s) after decrypting the protected content.

The protected content may be delivered to a content delivery network 4 associated to the client site 2, preferably a web server or an edge-caching network, for improving delivery time to the user device 3.

Hereinafter the method will be disclosed in more detail making reference to the communication flow inside the DRM server 1.

As is known, an Application Programming Interface (API) is a particular set of rules and specifications that a software program can follow to access and make use of the services and resources provided by another particular software program that implements that API. In other words, an API is an interface between different software programs and facilitates their interaction, similar to the way the user interface facilitates interaction between humans and computers.

An API can be created for applications, libraries, operating systems, etc., as a way of defining their "vocabularies" and resources request conventions (e.g. function-calling conventions). It may include specifications for routines, data structures, object classes, and protocols used to communicate between the consumer program and the implementer program of the API.

According to the method the SOAP API, hereafter also referred as Key Provisioning API, may be used by anyone implementing DRM protection, for example, by a third-party Media Encoder with all the key material needed to encrypt streaming samples. The delivered key material can in principle be used with any DRM technology, but it is especially focused towards the following environments including, for example, Microsoft PlayReady, Apple Streaming and Windows Media DRM 10.1.x.

This new API may provide support for live streaming scenarios, where it is important to be able to switch content encryption keys even within the same live stream. To these ends, the concept of "Crypto Period Number" (CPN) is introduced. Encoder vendors can obtain new encryption keys for a given stream simply by increasing the CPN, without changing the main content identifier.

To facilitate the use of this API, the user is allowed to pass in any content identifier that makes sense to him such as for instance: "Title, Season 6, Episode 2" (or any string of that kind). The Key Provisioning API will turn these content identifiers into content encryption keys using a special procedure described below.

After this phase, the Key Provisioning API will return an identifier—for instance a 16-byte "Key ID"—which can be used later on when requesting a license from the DRM server 1.

All these procedures may be implemented without needing to store content IDs, encryption keys, or seeds in any database table. As an example:

Key Provisioning Public Interface involves a service referred to as Key Provisioning. This service may accept the following parameters in the key provisioning request: DRM Protection System, e.g. one of "PlayReady", "Windows Media DRM", or "Apple HTTP Streaming"; External content identifier, e.g. any identifier that makes sense to the content provider, such as "Title1" or "Title2, Season 4, Episode 1"; Crypto Period Number, optional, e.g. an unsigned 64-bit integer that can be used for key scheduling purposes, different numbers, even with the same external content identifier, will yield different content encryption keys.

The key provisioning response may be one of three types: PlayReady, Windows Media DRM, or Apple HTTP Streaming. PlayReady Key Provisioning Response Key ID, e.g. a 16-byte array containing the key ID that uniquely identifies the content to PlayReady, and to the Entitlement API later on, it also may need to be part of the PlayReady protected header; Seed, e.g. a byte array of at least 30 bytes containing the seed used to generate the content key (in combination with the Key ID); Content Encryption Key, e.g. 16-byte array that can be used to AES-128 encrypt the contents, although this may be deterministically calculated on the basis of Key ID and Seed, it is returned for convenience. Windows Media DRM Key Provisioning Response: Key ID, e.g. 16-byte array containing the key ID that uniquely identifies the content to Windows Media DRM, and to the Entitlement API later on, it may also need to be part of the WMDRM protected header; Seed, e.g. a byte array of at least 30 bytes representing the seed used to generate the content key (in combination with the Key ID).

Apple HTTP Streaming Key Provisioning Response: Key ID, e.g. 16-byte array containing the key ID that uniquely identifies the content to the Entitlement API later on; Content Encryption Key, e.g. 16-byte array containing the AES key needed to encrypt the content.

A final step may be provided for transforming the arbitrary External Content Identifier into Key ID, Seed, and/or Content Encryption Key.

Hereafter, the phase of requesting the key(s) from the user device to the DRM server 1 is described in more detail. The request is preferably served by another API, also indicated as entitlement or license API, which is stored in the DRM server 1. The entitlement API returns a license to PlayReady, to WMDRM or an Apple CEK. The API takes in input the content identification and, for PlayReady or WMDRM, a test. The API is programmed to treat different content identification: If a content ID is received, for example xxxx@domain.com, a content metadata (most notably, the Seed) is retrieved and passed to an application, e.g. CrossTalk, to generate a license; If a content ID is received in a specific format, for example cid: #yyyyyyyyyyyyyyyyyyyyyyyyyyyyyyyy@domain.com, where it is 32 characters long and it is the hex-encoding of the Key ID, then the characters are converted into a 16-byte key ID (and the following step is executed); If a 16-byte Key ID is received, the Key ID is given in input to a key manager table, then the last 2 bytes are discarded, and the output is a 30-byte Seed.

Then only one of the following 3 cases may apply: —PlayReady, the Key ID and Seed are given in input to the license server to obtain a license; —Windows Media DRM, the Key ID and Seed are given in input to the license server to obtain a license; and —Apple HTTP Streaming, the Key ID and Seed are given in input into an algorithm which turns them into a Content Encryption Key.

As to the client site 2, details of the structure and functioning of the DRM-batch-protector that is preferably an offline content protection tool will be discussed. The ability to package content offline is possible by the above disclosed Key Provisioning API that allows to generate a desired amount of content protection keys in advance.

The DRM-batch-protector 21 may have two modes of operation: KEY_FILE and PROTECT. When working in KEY_FILE mode, the DRM-batch-protector 21 calls key provisioning API of the specified DRM server and retrieves a specified amount of content encryption keys that are put into a file. Content encryption keys are protected with a password that is also specified on the command line. When working in PROTECT mode, the DRM-batch-protector 21 reads content from specified input directory, protects it and writes it to the specified output directory. The keys that are used for protection are extracted from the key file that has been created in KEY_FILE mode. The PlayReady envelope protection is supported by DRM-batch-protector 21.

According to the present invention a mode referred to as LIVE may be added to DRM-batch-protector 21. When working in this mode the DRM-batch-protector is able to encrypt content that is being segmented live. The DRM-batch-protector is able to read raw content from a directory or from a URL. When specifying URL—it should be pointing to the playlist (master). All other DRM-batch-protector properties should be valid. The encryption keys should be taken from the key file.

When working in LIVE mode the DRM-batch-protector 21 may execute the following actions: Download master playlist (if URL specified) or read it from the file system; Read the playlist and extract child playlists that are specified in the master playlist, or return the master playlist itself; Fork off a thread per each child playlist that would take care of synchronizing raw content with protected one; and DRM-batch-protector would keep running until it would receive a Control-C command, then the threads would shutdown gracefully and DRM-batch-protector would exit.

According to the invention, the DRM-batch-protector may be scheduled to execute at specified time intervals. For example, the default may be 10 s.

While synchronizing the content, DRM-batch-protector 21 may perform the following steps: Read playlist into memory and retrieve all raw content files from it; Check if an encrypted file version already exists in the output directory, if not—add it to the new files list; After the check for new files is complete, all the old files in the output directory that do not exist in the playlist will be added to the old files list and would be eventually deleted. The synchronization process may be executed by: Deleting old files from the previous run (this is done to prevent files being deleted while some DRM agents might still be using them); Encrypting new files; Copying new playlist to the output directory; and Updating old files list so that they would be deleted on the next run.

The DRM-batch-protector 21 may log errors when they occur and keep running.

During protection, from the URL it might happen that a 404 error is returned from the raw content server while trying to retrieve the content file that was specified in the playlist. DRM-batch-protector 21 should log such error on DEBUG level and try to sleep for ½ of the time that a thread sleeps at scheduled interval.

If an error is returned while trying to refresh the playlist—DRM-batch-protector 21 should retry after a scheduled thread sleep interval, if the same error is returned again, then thread sleep interval should be increased 2, 3, 4, 5 times each time an error is returned. Once the thread sleep interval is increased to 5 times its original time—DRM-batch-protector 21 should continue running until a valid response is received from the server. Once a valid response is received—thread scheduled sleep time would return to normal.

A property may be added to DRM-batch-protector 21 that would cause playlist files to be rewritten in a more friendly format. This could be done by removing any non-alphabetic and non-numeric characters from playlists and content file names and adding proper file extensions. Extensions that should be added to playlist and content files should be specified as properties and default for instance to .m3u8 for playlist and .ts for content files.

To satisfy requirements of constant availability, DRM-batch-protector 21 may be updated with monitoring. This would allow to easily check DRM-batch-protector status and take any additional measures if needed. SNMP monitoring framework from DRM server can be re-used here.

The present invention also relates to a system for protecting digital contents including: a DRM (Digital Right Management) server configured to derive at least one key; and a client configured to store digital content or receive streaming digital content to be protected, and configured to receive a derived key from the DRM server, and configured to transmit protected digital content to a user device including a key identification. The DRM server is configured to receive the key identification from the user device to derive the key for the user device.

The client site 2 includes a DRM batch protector module 21 configured to request key generation from the DRM server 1 before encrypting the digital content to be protected which is then performed offline in the DRM batch protector module after receipt of the derived key from the DRM server as an encryption key. The DRM batch protector module 21 is configured to read the digital content from a local directory or from a URL (Uniform Resource Locator) and retrieve the encryption key from a key file provided to the DRM batch protector module by the DRM server with password protection.

The DRM server 1 comprises a SOAP API programmed to receive in input from the DRM batch protector module 21 an identification of the digital content and a number associated to the number of streams or segments in which the digital content is to be encrypted and to return in output at least one code for protecting the digital contents. In one embodiment of the invention, the code includes a key ID and a seed. The DRM batch protector module 21 is programmed to derive the content encryption key from the key ID and the seed. In another embodiment, the SOAP API is programmed to directly return the content encryption key the DRM batch protector module 21.

Preferably, the format of key ID, seed and content encryption key comply with a plurality of DRM protection systems, including for example "PlayReady", "Windows Media DRM", "Apple HTTP Streaming".

Hereafter, the features of an example method and system according to the invention are briefly summarized. Keys are generated in the DRM Server 1 and delivered out-of-band and securely to a client 2, preferably to a batch protector of the client. The number of keys delivered depends on the encryption job. The key is derived from an internal key table thus there is no storage of keys per se in the DRM Server. Keys are identified by key ids and forms the basis of the key derivation function Key tables can exist on a per client basis, further increasing security by segregating the key space between clients. The delivered key file is encrypted with a password of choice.

Batch protector is configured with the keys and subsequently started to protect the content. This content can be a bunch of files stored on disk on the client or retrieved streaming resource and protecting it "on-the-fly". Keys are consumed as required from the previously delivered secure key file. Then, the keys are marked as consumed The protected content is delivered to the content delivery network of the client, for example a simple web server or a edge-caching network. This depends on how quickly the client should deliver the content to the user devices.

The device downloads the content, detects that it is DRM protected and initiates license acquisition.

DRM Server receives the license request and generates the encryption key based on the information received. The key id is used to derive the key. This is shipped as part of the license acquisition protocol. The device consumes the license and can decrypt the content.

Now with reference to FIGS. 3-8, another aspect of the invention will be described.

Figure 3:
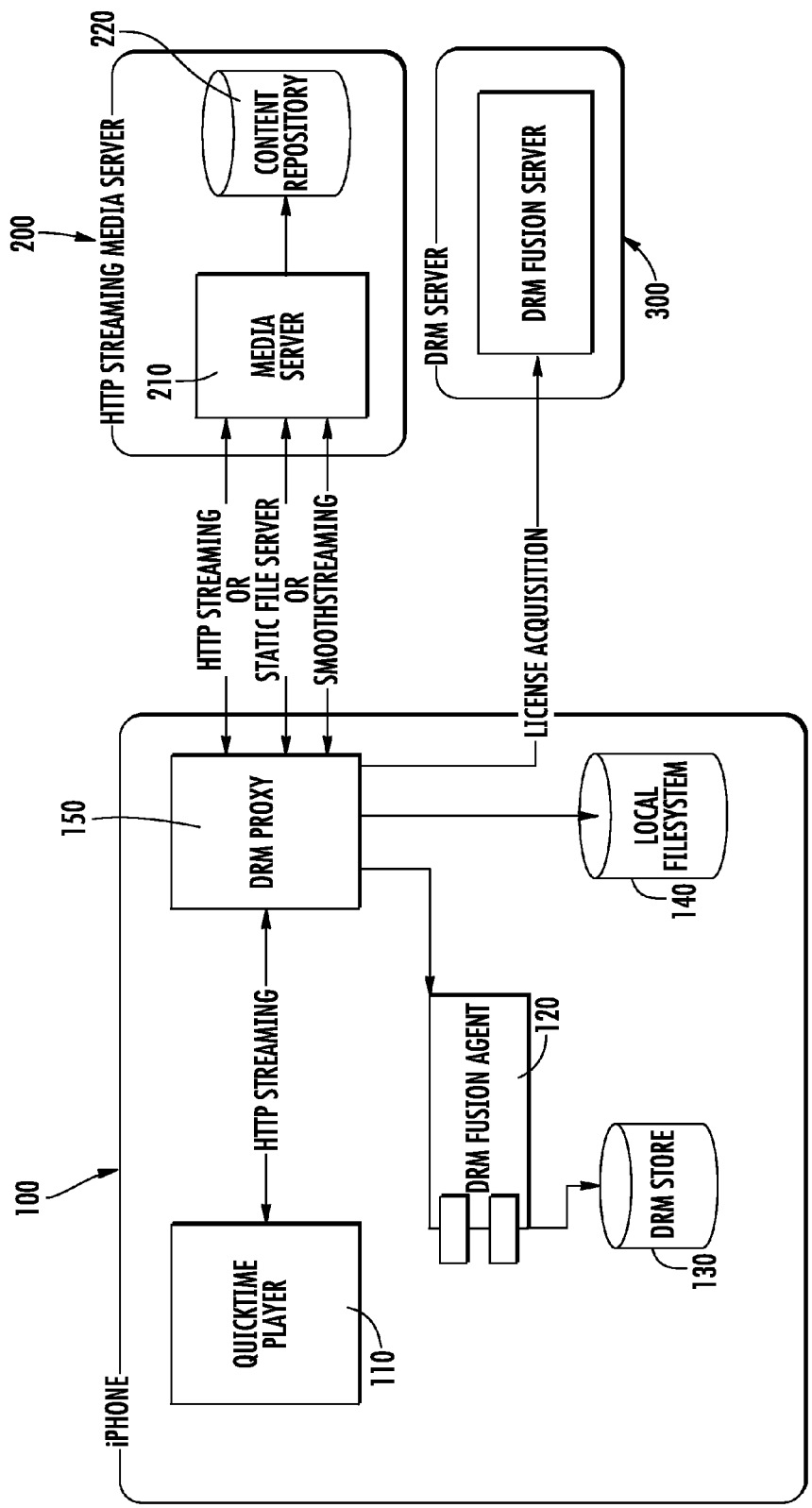
FIG. 3 is a block diagram schematically representing a system and method according to an embodiment of the invention.

FIG. 3 schematically represents a user device 100 requesting digital contents, a multimedia server 200 or provider server, providing contents to the user device, and a license server 300 or DRM server, managing licenses of a DRM scheme.

Referring to FIG. 3, the user device 100 comprises a multimedia player, a DRM Fusion Agent 120, DRM store 130, Proxy server 150 and Local file system 140. The Proxy server 150 is stored in the user device, and provides HTTP streaming service to the multimedia player 110.

The user device 100 comprises a multimedia player 110 or native player, to play the digital contents, the DRM Fusion Agent 120 for downloading and decrypting the contents, the DRM store 130 for storing encryption keys and the Local file system 140. Advantageously, the user device 100 further comprises a DRM application, also indicated as Proxy server 150, enabling the multimedia player 110 to play a predetermined HTTP streaming service provided according to different DRM schemes.

More particularly, the proxy server 150 runs as a local web/streaming server on the user device 100 and translates static or streaming contents into a streaming format which is readable from the multimedia player 110.

For example, the user device 100 may be an iPhone and the multimedia player 110 is the native player of iPhone, i.e. Quick Time Player, which is used to download and play digital contents according to the Apple HTTP Live Streaming scheme, even if the scope of invention is not limited thereto.

The proxy server 150 may handle license acquisition, rights management via the DRM Fusion Agent 120. According to the invention, the proxy server 150 translates the HTTP Streaming provided according to other DRM schemes into a format readable to the iPhone native player 110.

The multimedia server 200 may comprise a front-end media server 210 and content repository 220 as represented in FIG. 1. The frontend 210 receives request for accessing multimedia contents from the user device 100 and sends a response after processing. More particularly, the frontend 210 accesses the content repository 220 and retrieves the multimedia content requested by the user device 100, while the multimedia sever 200 supports several communication protocols such as Apple HTTP Live Streaming, Microsoft Smooth Streaming or transmission of a static file to the user device.

The specific protocol used between the multimedia server 200 and the proxy server 150 is not limited to the examples provided.

Figure 4:
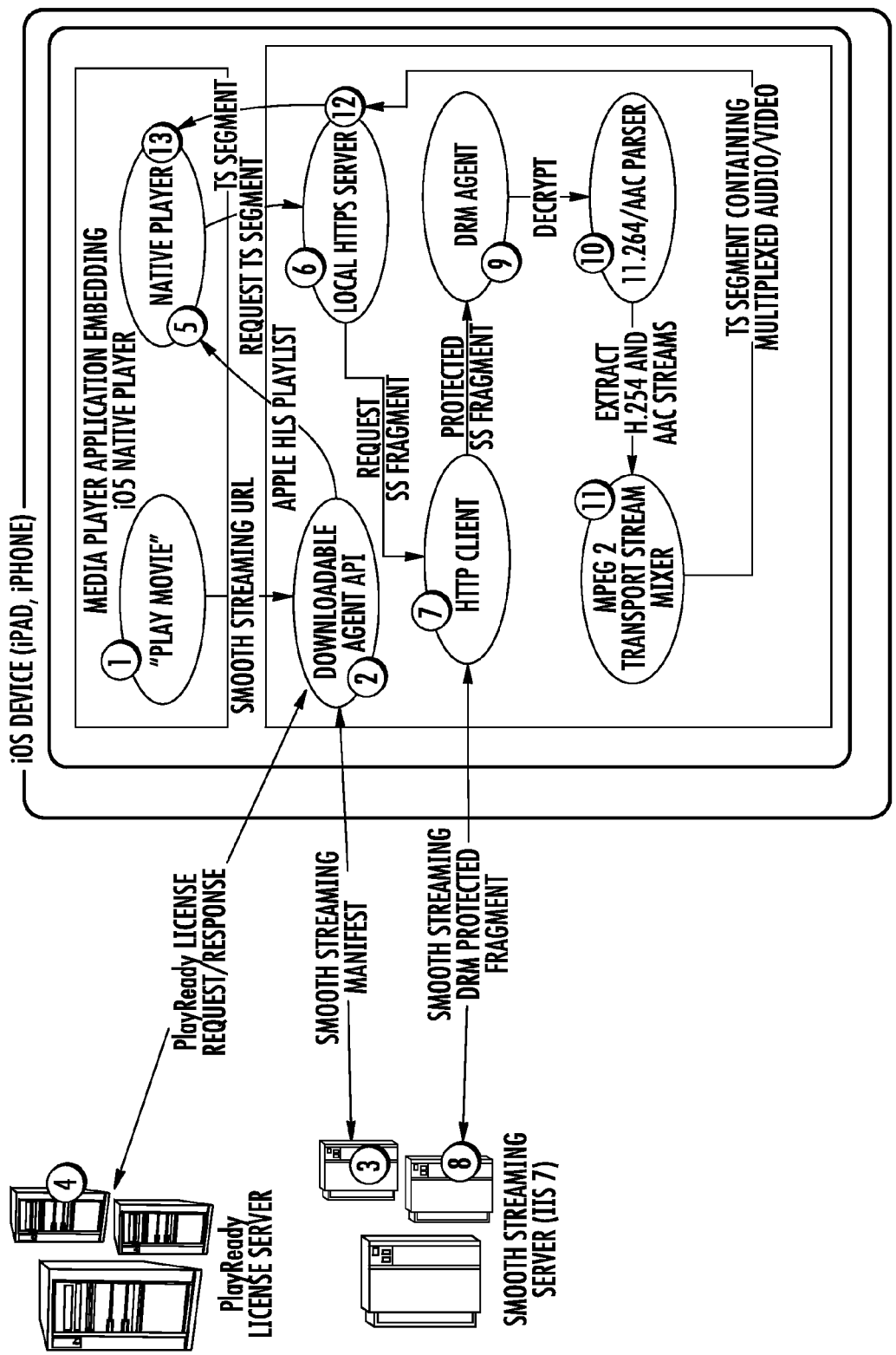
FIG. 4 is a schematic diagram illustrating a proxy server in the user device operating with a multimedia player, and the multimedia server according to an embodiment of the present invention.

FIG. 4 schematically represents a more detailed view of the components of the proxy server 150, or DRM application, in the user device 100 operating with a multimedia player 110, or native player, and communicating with the multimedia server 200 or server provider. The example is described when a Smooth Streaming Server (IIS7) is used as multimedia server 200, and the well known so-called PlayReady standard is used as a DRM standard. The multimedia player 110 of the user device 100 supports the HTTP protocol for streaming.

Hereinafter the process steps or phases involved with or following a user's request is discussed. Each step has a corresponding reference numeral in FIG. 4. Hereinafter, each of the step will be explained in detail.

First, in step 1, the multimedia player 110 receives an instruction of "Play Movie" from GUI. The user is presented with a graphical interface allowing him/her to play a movie associated with a certain Smooth Streaming URL. Then, in step 2, a Downloadable Agent API receives the Smooth Streaming URL, and downloads the Smooth Streaming manifest from the web server (e.g. IIS 7). In subsequent step 3, the web server returns the Smooth Streaming manifest. The Smooth Streaming manifest may include a playlist.

At this point, the API (2) applies some relatively straightforward transformations to transform it into an HLS playlist. The conversion may work as follows:

a. Create a master playlist pointing to bitrate-specific playlists—as many as there are <QualityLevel> entries for the video stream.

b. For each <QualityLevel> entry, create a bitrate-specific playlist. Each of these playlists will contain a number of TS segments, enough that each segment will result to be approximately 10 seconds in lengths. For example, the original Smooth Streaming manifest may contain 20 <c> entries representing a Smooth Streaming fragment each. Each of theses fragments may have a d (duration) attribute of 3 seconds. In that case, the final playlist will have a total of 7 TS segments: 6 of ~9 seconds, and the last one of ~6 seconds.

c. Each of the TS segments is actually an (obfuscated) URL pointing to localhost (i.e. the device itself) on a randomized port.

Additionally, at this point the Downloadable Agent API starts a local HTTPS listener on the port that was used when creating the HLS playlist. Then, in step 4, the PlayReady License server 300 is called to intervene. If the Smooth Streaming manifest contains the <Protection> element, then the content is DRM-protected. In this case, the API requests and receives a license from the license server using the PlayReady content header contained in the manifest. The API sends to the native player 110 the playlist.

In step 5, the native player 110, for instance using Apple's algorithms for bitrate throttling, will pick the most suitable bitrate and attempt to play segments sequentially off of it. By doing so it will hit the local web server 150. It should be noted that the native player 110 does not need to have a full sense of the actual network conditions, given that it will only communicate with the local web server 150 rather than with the content server 200 which is on the Internet.

This means that if the native player 110 is using some heuristic algorithms to try and estimate the available bandwidth, it may not be able to do so unless the local web server 150 somehow mimics these conditions on the local interface, for instance by throttling the data delivery rate to match that of the WAN interface. Therefore, according to the present invention, this throttling action of the data delivery rate has an important effect for streaming protocols such as HLS because they use just these algorithms to decide what stream to play.

Then, in step 6, the local HTTPS server 150 may receive from the native player a request of three possible types:

a. Master playlist request. In this case, the local server will serve up the master HLS playlist that was computed at the beginning.

b. Bitrate-specific playlist request. In this case, the local server will serve up the requested bitrate-specific HLS playlist that was computed at the beginning.

c. A single TS segment. In this case, the local web server will assemble a TS segment as described in steps 7 through 11 below.

The incoming local HTTPS request contains the start timestamp of the Smooth Streaming fragment the user wants to retrieve, step 7. The API then uses a set of algorithms to determine the following:

a. How many Smooth Streaming fragments are needed in order to total 10 seconds, b. The start timestamp of the corresponding audio fragment, and c. How many audio fragments are needed.

At this point, the HTTP client will perform a number of parallel HTTP GET requests to the Smooth Streaming server to retrieve all these video and audio Smooth Streaming fragments. After that, step 8, the web server returns all the requested Smooth Streaming fragments, which at this point are still PlayReady DRM-encrypted.

If the downloaded fragments are encrypted, then in step 9 the DRM Agent 120 will decrypt them in-memory 130 using the license previously acquired. A further step 10 is provided wherein the Smooth Streaming fragments are then parsed to extract the raw H.264 streams and the raw AAC streams. All raw H.264 streams are then concatenated together to reach a length of about 10 seconds, and the same goes for all raw AAC streams.

In step 11 the MPEG 2 Transport Stream multiplexer component takes the concatenated H.264 stream and the concatenated AAC stream and multiplexes them together, taking care that the timestamps are in sync. It thus generates an MPEG 2 Transport Stream segment. The segment is returned to the local HTTPS server 150 in a step numbered 12. The HTTPS server 150 fulfils the local request by returning the multiplexed TS segment in step 13, which the native player 110 plays in the correct sequence order.

Therefore, the above described approach allows a content encoded with Microsoft Smooth Streaming and encrypted with Microsoft PlayReady DRM to reach iOS devices and to be displayed smoothly, while retaining the adaptive streaming capabilities of the Smooth Streaming protocol.

Moreover, the approach renders possible to keep simultaneously this content DRM-protected as long as possible to avoid snooping, interception, and capture. In other words, the approach allows the implementation of the DRM-protected Smooth Streaming library for a Downloadable Agent with Native Player on a iOS environment.

Figure 5:
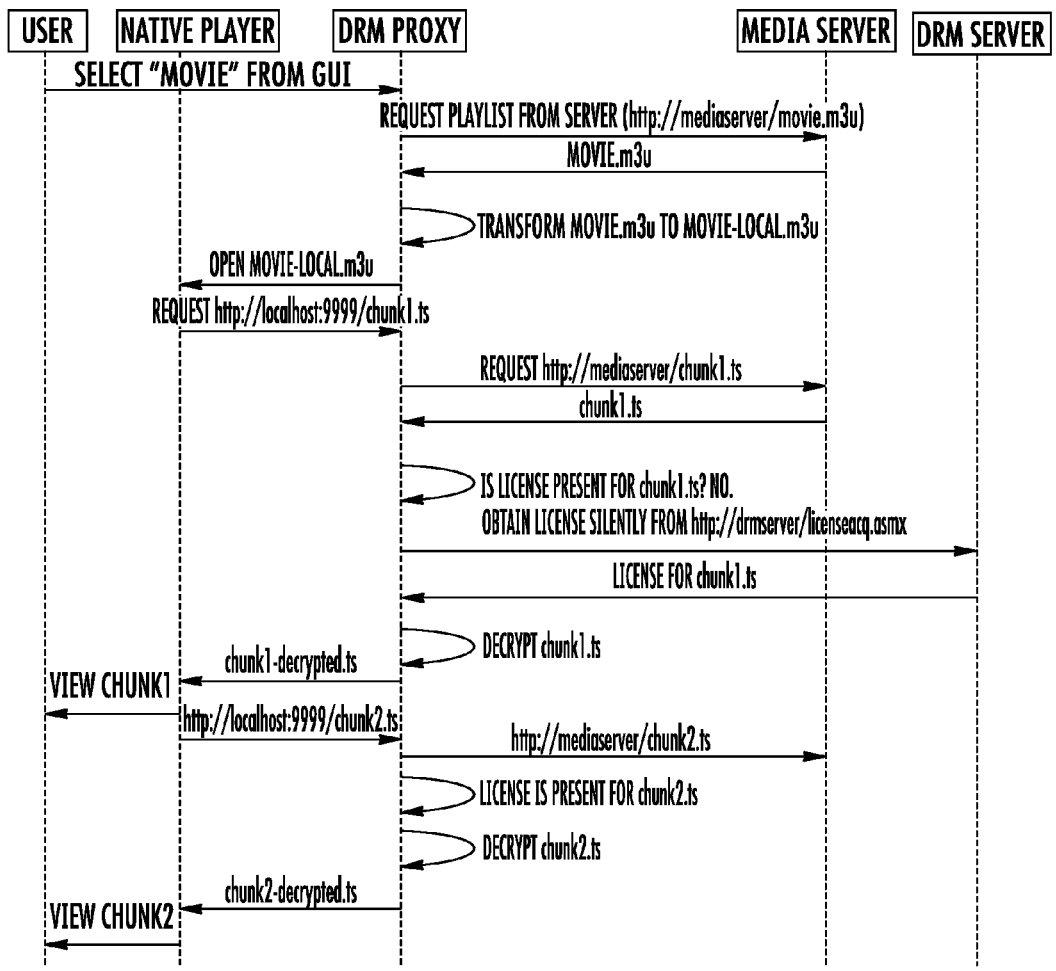
FIG. 5 is a communication timing diagram schematically illustrating a method for playing digital contents protected with a DRM scheme, according to an embodiment of the present invention.

With reference to FIG. 5, it is schematically represented the method for playing digital contents according to the invention, wherein, in this example, the DRM proxy of an iPhone communicates with a corresponding Quick time Player and with a HTTP streaming remote media server via Apple HTTP Streaming. The user device 30 selects digital content from a list of contents in the GUI (Graphic User Interface); from the user point of view, the application simply opens the native player, Quick time Player, which starts playing the contents after a short delay.

However, hidden to the user, the following steps may be executed: The DRM proxy displays a GUI with a list of contents; the list is retrieved from a website or is hard-coded in the application; The user selects a desired content, and preferably, there is a one-to-one correspondence between contents and playlist, therefore the DRM proxy may detect which playlist to retrieve from the server for a content requested from the user; The DRM proxy retrieves the original playlist, for example HarryPotter.m3u which comprises, for example, the following packets: "http://mediaserver/packet1.ts", "http://mediaserver/packet2.ts", . . . ; The DRM proxy transforms the playlist in a local playlist (In an aspect of the present invention, the transformed playlist, for example HarryPotter-local.m3u, replaces the real hostname/port with the local hostname/port, as "http://localhost:9999/packet1.ts", "http://localhost:9999/packet2.ts", . . . ; The DRM proxy passes the transformed playlist to native player, for example Quick Time player; The native player, which is enabled to read the M3U format, requests the first file from the local playlist, i.e. http://localhost:9999/packet1.ts; The DRM proxy applies a reverse transformation on the host name, and requests http://mediaserver/packet1.ts from the media server; Media server transmits the corresponding packet, packet1.ts, more particularly, packet1.ts is PlayReady envelope-encrypted; The DRM proxy, calls a DRM Agent in a DRM server, checks if it has a license for packet1.ts, and if the license is not detected the DRM Proxy, calls the DRM Agent and navigates to the silent License Acquisition URL which is included in an encrypted content's header, for example http://drmserver/licenseacq.asmx, and in this respect, according to an aspect of the present invention, all the packets packet1.ts, packet2.ts, have the same content Identification DRM-wise (which is for example the same for the whole movie) and therefore share the same license/decryption key (in this respect, in a different embodiment of the invention, the license acquisition is started before starting the native player with the playlist; this is advantageous because, if no license may be obtained, it is not necessary to start the native player); The DRM server returns silently a valid license; The DRM Proxy, calls DRM Fusion Agent and decrypts packet1.ts in memory; and the DRM Proxy returns the decrypted packet1 to the native player, which displays the video packet to the user.

According to another embodiment of the invention, the DRM Proxy does not decrypt but it leaves each packet encrypted. It inserts an EXT-X-KEY item at the top of the playlist, using a same AES-128 key used in the PlayReady encryption, for example. The DRM Proxy, instead of decrypting the packet, will only proceed to remove the PlayReady envelope header, leaving only the raw AES128-encrypted data. The DRM Proxy then pass this raw data back to Native Player. The Native Player, with EXT-X-KEY, obtains the decryption key and decrypts the packet itself.

The native player requests the second playlist item, http://localhost:9999/packet2.ts. The DRM proxy calls the DRM Agent and checks if it has a license for packet2.ts. in the example given above, i.e. all the packets have the same decryption key, the license key is available. The DRM proxy calls the DRM Agent, decrypts packet2.ts in memory.

The DRM proxy returns decrypted packet2 to Native Player, which displays the video packet to the user. These last four steps are repeated for all the video reproduction.

Figure 6:
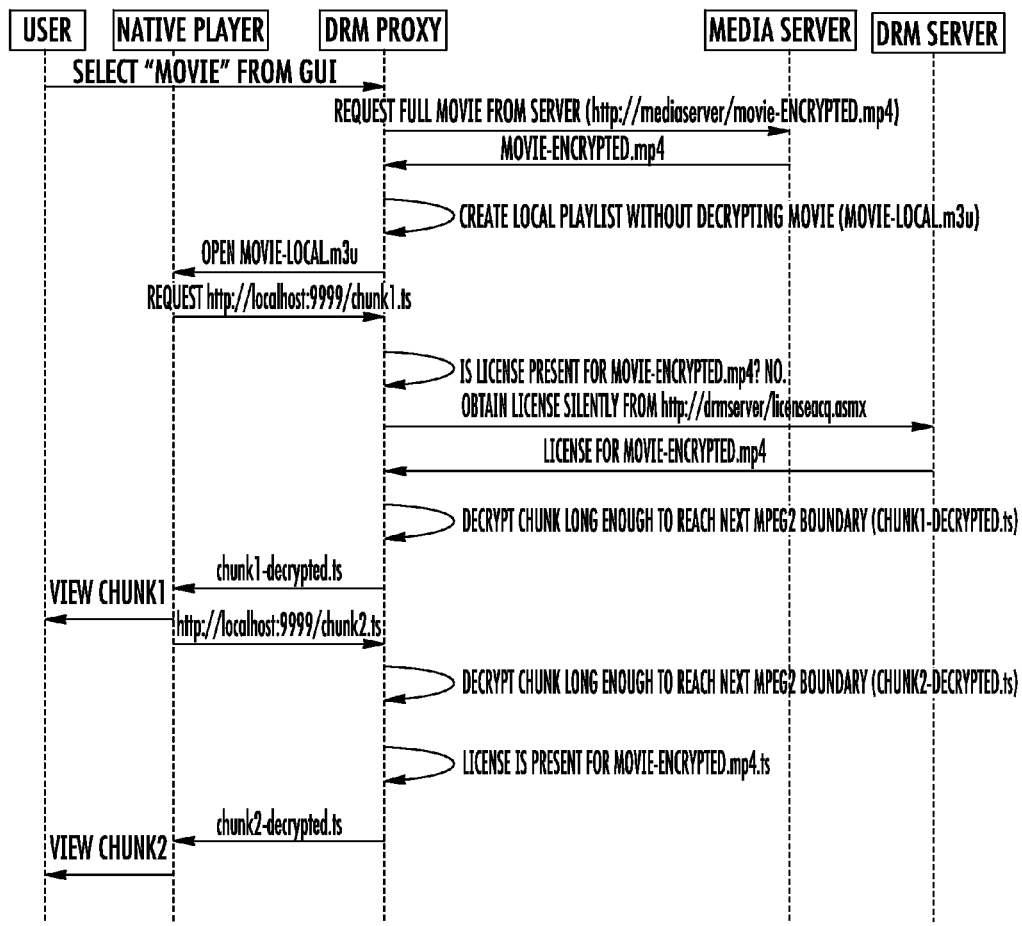
FIG. 6 is a communication timing diagram schematically illustrating a method for playing digital contents protected with a DRM scheme, according to an embodiment of the present invention.

With reference to FIG. 6, it is schematically represented the method for playing digital contents according to another aspect of the invention. In this case, the DRM proxy of an iPhone communicates with a corresponding Quick time Player to play a static file. More particularly, the following steps are executed: The DRM Proxy shows the GUI with a list of contents. This list can be retrieved from a website or hard-coded in the application; The User selects the desired content; The DRM Proxy retrieves the full PlayReady-envelope encrypted file HarryPotter-encrypted.mp4; The DRM Proxy creates a new local playlist without yet decrypting the file, the new playlist, for example HarryPotter-local.m3u, is in the form: "http://localhost:9999/packet1.ts", "http://localhost:9999/packet2.ts", "http://localhost:9999/packetN.ts", in this step, the DRM Proxy uses heuristics to determine a number of packets ("N") to be used, based on the content length, this is because it is memory-consuming to decrypt the whole movie in memory beforehand; The DRM Proxy passes the transformed playlist to the native player; The native player, detecting the M3U format, requests the first file from its playlist, http://localhost:9999/packet1.ts; The DRM Proxy checks whether a license is available for the whole movie file, and if the license is not detected, the DRM Proxy calls the DRM Agent, navigates to the silent License Acquisition URL contained in the encrypted content's header, for example http://drmserver/licenseacq.asmx (also in this example, it is assumed that there is only one DRM content ID (for example, the same for the whole movie) and therefore all packets share the same license/decryption key), as already stated above, according to a different embodiment, the license acquisition is started before invoking the native player; The DRM Server returns silently a valid license; The DRM Proxy calls the DRM Agent, decrypts in memory 1/Nth of the movie plus enough data to reach the next MPEG 2 boundary, this is the decrypted packet1, and in this respect, in order to comply with the HTTP Streaming specification, each packet is terminated on an MPEG 2 boundary, with some additional restrictions; The DRM Proxy returns decrypted packet1 to Native Player, which display the video packet to the user.

Also in this case, according to another embodiment of the invention, the DRM Proxy does not decrypt at all but it leaves the whole movie encrypted. It inserts an EXT-X-KEY item at the top of the playlist, using the same AES-128 key that was used in the PlayReady encryption. The DRM Proxy, instead of decrypting the movie, proceeds to remove the PlayReady envelope header, leaving only the raw AES128-encrypted data, and then simply cut off a still-encrypted packet of (movie length)/(number of packets) length. DRM Proxy then passes this raw data back to Native Player. The Native Player, with EXT-X-KEY, obtains the decryption key and decrypts the packet itself.

The Native player requests the second playlist item, http://localhost:9999/packet2.ts. The DRM Proxy, calls the DRM Agent, checks if it has a license for the whole movie file. If all the packets have the same decryption key, the license is available. The DRM Proxy calls the DRM Agent, decrypts in memory the next 1/Nth of the movie plus enough data to reach the next MPEG 2 boundary, i.e. the packet2 decrypted. The DRM Proxy returns packet2-decrypted to Native Player, which displays the video packet to the user. The last four steps are repeated for displaying all the digital content.

Figure 7:
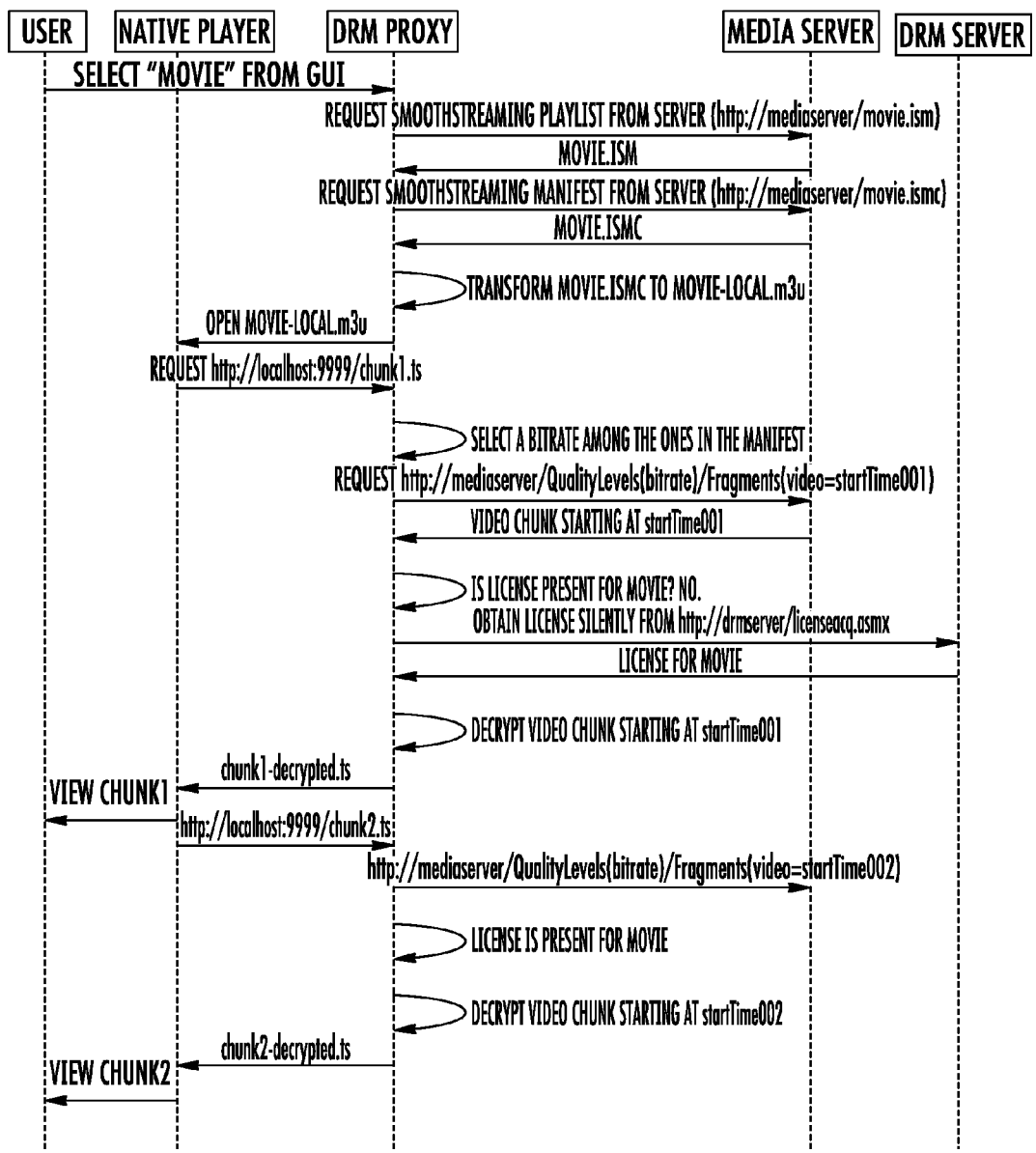
FIG. 7 is a communication timing diagram schematically illustrating a method for playing digital contents protected with a DRM scheme, according to an embodiment of the present invention.

With reference to FIG. 7, it is schematically represented the method for playing digital contents according to another aspect of the invention. In this case, the DRM proxy of an iPhone communicates with a corresponding Quick time Player and with a Microsoft Smooth Streaming from a remote server to play the digital content. More particularly, the following steps are executed: The DRM Proxy shows a GUI with a list of contents, this list can be retrieved from a website or hard-coded in the application; The User selects a desired content; Preferably, there is a one to one mapping between contents and playlist so that DRM Proxy detects the playlist to be retrieve from the server; The DRM Proxy retrieves the original SmoothStreaming playlist and Manifest files.

The DRM Proxy transforms the playlist in a local playlist, the transformed playlist (HarryPotter-local.m3u) has the same number of packets as the original manifest but points to "files" on the local DRM proxy: "http://localhost:9999/packet1.ts", "http://localhost:9999/packet2.ts", . . . ; The DRM Proxy passes the transformed playlist to the native player, the playlist name is not expected to show anywhere in the UI; The Native player, which understands the M3U format, requests the first file from its playlist, http://localhost:9999/packet1.ts.

The DRM Proxy selects a suitable bitrate among the ones offered in the server playlist. In this respect, according to a first aspect of the invention, the bitrate is constant. The DRM Proxy transforms the playlist entry into an HTTP GET request compliant with the SmoothStreaming URL format (http://mediaserver/QualityLevels(chosenBitrate)/Fragments(video=startTime001), and sends the request to the media server. The Media server serves video packet starting at startTime001. The packet is PlayReady envelope-encrypted. The DRM Proxy calls the DRM Agent, checks if it has a license for the whole movie.

If a license is not available, the DRM Proxy calls the DRM Fusion Agent, navigates to the silent License Acquisition URL contained in the encrypted packet's PlayReady header, for example http://drmserver/licenseacq.asmx. Also in this case, it is assumed that all packets have the same content ID DRM-wise; license acquisition might be started before invoking the native player with the playlist. The DRM Server returns silently a valid license. The DRM Proxy calls a DRM Agent, decrypts the video packet into decrypted packet1 in memory. In this respect, if the codecs supported by SmoothStreaming are also not valid codecs for HTTP Streaming, an additional decoding/re-encoding step is necessary at this stage. The DRM Proxy returns decrypted packet1 to Native Player, which displays the video packet to the user.

In a different embodiment of the invention, the DRM Proxy does not decrypt at all but it leaves each packet encrypted. It inserts an EXT-X-KEY item at the top of the playlist, using the same AES-128 key used in the PlayReady encryption. The DRM Proxy, instead of decrypting the packet, proceeds to remove the PlayReady envelope header, leaving only the raw AES128-encrypted data. The DRM Proxy then passes the raw data back to Native Player. The Native Player, with EXT-X-KEY, obtains a decryption key and decrypts the packet itself.

The Native player requests the second playlist item, http://localhost:9999/packet2.ts. The DRM Proxy calls the DRM Fusion Agent, checks if it has a license for the whole movie. Also in this case, this is assumed to be true. The DRM Proxy calls the DRM Fusion Agent, decrypts the video packet in memory. The DRM Proxy returns packet2-decrypted to the Native Player, which displays the video packet to the user. The last four steps 16-19 are repeated for all the digital content execution.

To implement the method of the invention, there is provided an agent which is downloadable into the user device and acts as the DRM application to play digital contents protected by several DRM scheme. The Agent is integrated with the user device platform's native media player. This is advantageous with respect to using a 3rd party player, since the user device hardware acceleration may be used to decode and render video, making the playback smoother and allowing for higher quality content.

Figure 8:
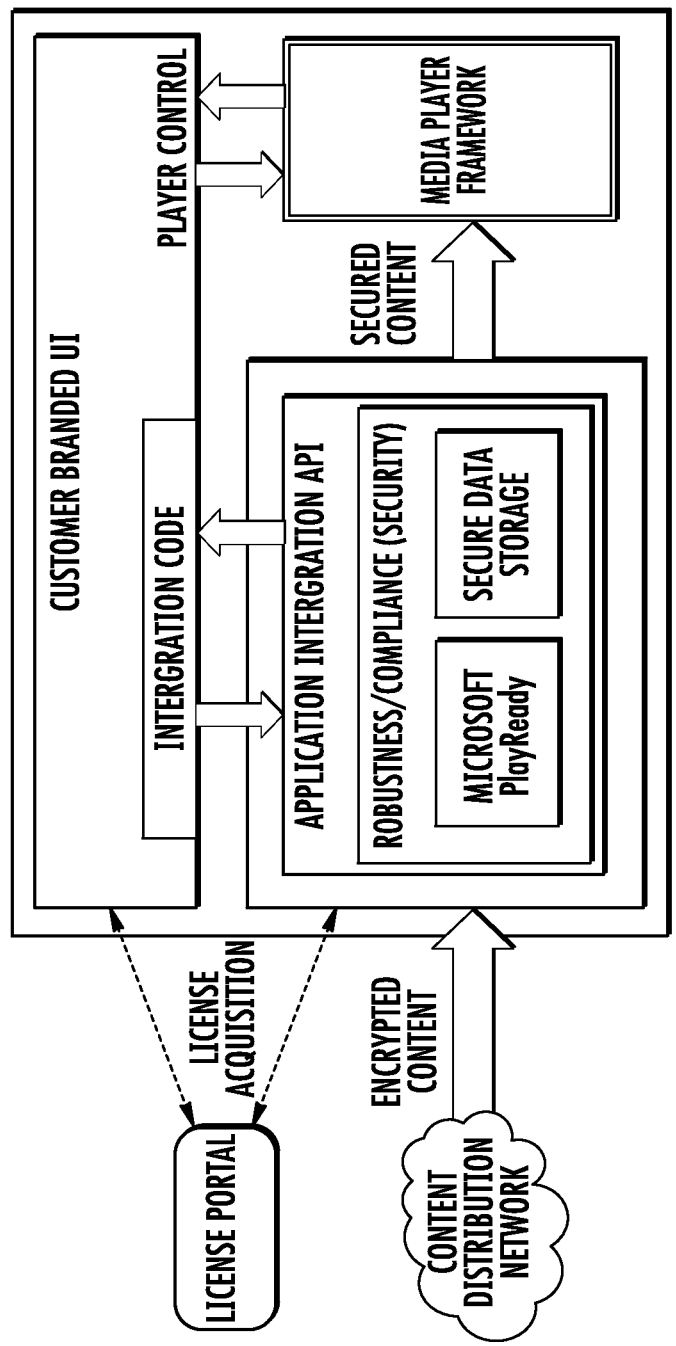
FIG. 8 is a schematic diagram illustrating an integration of an agent implementing a DRM proxy and the other application of the user device playing digital contents protected by a DRM scheme, according to an embodiment of the present invention.

Moreover, using the native player to play DRM protected content, a simpler user interface, integrated with the other application of the user device may be provided. The Agent supports streaming content via the HTTP Live Streaming protocol, and support for other streaming protocols such as Microsoft's Smooth Streaming and for content downloaded to the device. FIG. 8 schematically represents the integration of the user device application and the Agent and the communication with external devices.

The Agent is integrated with an application created by the customer and it is hidden to the user, since it has no UI element on screen. Preferably, the Agent manages the customer application and/or the native player with a public API. The Agent's API includes a set of methods or instructions which enables the customer application or the native player to acquire licenses for protected content and prepare the native player to play it. This API is provided as a static linked library written in Objective C. A Media Player Framework included in the iOS SDK (Software development kit) enables the application to customize some features of the native player, for example the size and position of video rendering view or the playback controls. Only when used in conjunction with the Agent, it can be used to play content protected with PlayReady DRM.

According to the invention, a user device for playing digital contents protected by a DRM scheme and stored in a server provider is also provided. The user device comprises a DRM application interfacing the server and a native player of the user device, the DRM application being configured for:
  selecting a digital content to be downloaded and retrieving a corresponding remote playlist;
  transforming the remote playlist in a local playlist having a format readable from the native player and associated to a plurality of local packets of the digital contents to be played in the native player and, for each local packet:
  requesting a corresponding remote packet to the server;
  acquiring a license to decrypt the remote packet;
  decrypting the remote packet and returning the decrypted packet to the native player as the local packet to be played.

The DRM application is configured to connect a DRM server for acquiring the license and to send an URL included in the digital contents for retrieving the license. It is also configured to acquire the license before activating the native player and to activate the native player only if the license is acquired. More particularly, the DRM application is configured to acquire one license available to decrypt all the remote packets of the remote playlist, the license being preferably associated to the first remote packet of the remote playlist. The remote playlist retrieved from the DRM application may include only one remote packet corresponding to the entire digital content and the DRM application is configured to divide the remote packet in the plurality of local packets to be displayed in the native player.

According to an aspect of the invention, the DRM application is configured for retrieving a SmoothStreaming playlist and Manifest files and selecting a bit rate among the bit rates available in the remote playlist. Moreover, the native player is configured to request an HTTP connection for receiving the digital content and the DRM application is configured to secure a communication between the native player and the server provider and for:

receiving a request to access the content of the server provider from the native player with a first URL associated with the content, the first URL not including an effective URL which provides direct streaming from the server provider for said content;

sending a request for receiving the remote playlist associated with the content to the server provider, based on the request from the native player;

receiving the remote playlist from the server provider, including at least one bit-rate information for the content;

generating the local playlist based on the remote playlist, the local playlist including at least one bit-rate information, a corresponding URL and corresponding port number, wherein the corresponding URL includes the user device and the corresponding port number is generated randomly;

requesting a license associated with the content to the DRM server if the content is protected by DRM;

sending the local playlist to the native player;

receiving an HTTP request associated with the content from the native player through a port which is determined based on a bit-rate of the local playlist selected by the native player;

requesting a streaming for the content having said bit-rate selected to the server provider;

receiving said packets associated with the digital content from the server provider;

decrypting the packets with said license if the plurality of packets is protected by DRM; and sending a HTTP response corresponding to the HTTP request to the native player, the HTTP connection response including the decrypted content.

The DRM application is further configured for parsing the packets and storing temporarily the parsed packed into an audio stream buffer and video stream buffer separately, after receiving the packets; and muxing the parsed audio stream and the parsed video stream with a sync information into a segment, the HTTP connection response including the segment to be played by the multimedia player. The parsed video stream is H. 264 stream, the parsed audio stream is AAC stream, and the muxing is performed by MPEG2 Transport Stream muxer.

According to an embodiment, the first URL is smooth streaming URL, the remote playlist is a smooth streaming manifest, and the local playlist is HLS playlist. The streaming for the multimedia content to the content server is performed through HTTP protocol using a number of parallel HTTP GET request.

Advantageously, according to the present invention, the native player of the user device is used to play the content even if the DRM scheme requires a different and specific player. Advantageously, the communication between the native player and the operating system of the user device is faster than a communication between such operating system and a specific and non-native player. In fact, the native player may use the accelerator provided by the operating system of the user device for rendering the digital contents. Advantageously, the download of a third party player in the user device is avoided.

Another aspect of the invention will now be discussed with reference to FIGS. 9 and 10.

Figure 9:
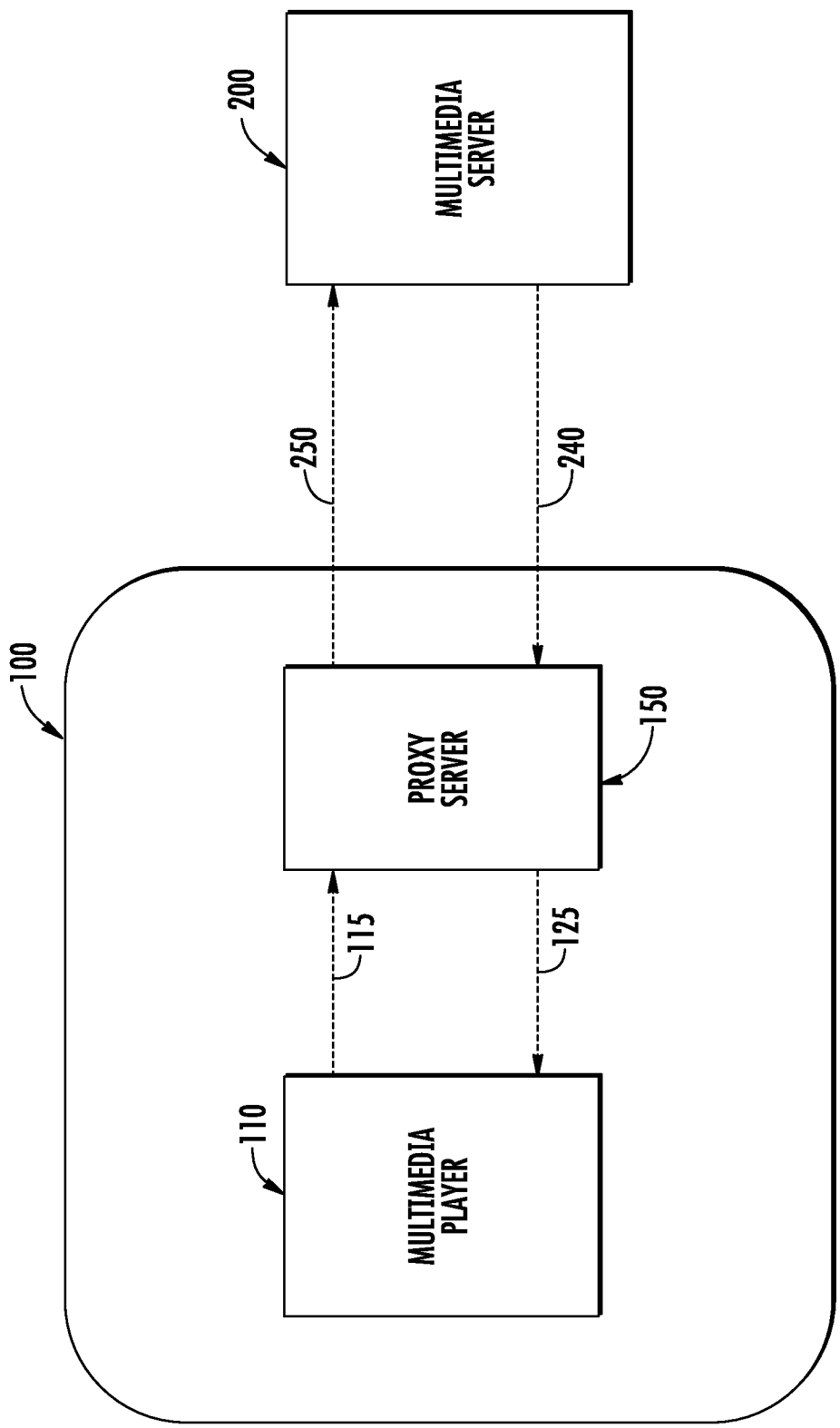
FIG. 9 is a schematic diagram illustrating an exemplary communication flow when special protocol, for instance the Apple HTTP Streaming protocol, is used between the proxy server and the multimedia server according to an aspect of the invention.

Referring now to FIG. 9, an exemplary communication flow between user device 100 and multimedia server 200 will be discussed.

The user device 100 comprises a multimedia player 110 and a proxy server 150. The multimedia player 110 communicates with the proxy server 150 to receive multimedia content from the multimedia server 200.

The proxy server 150 is installed in the user device 100. The proxy server 150 may be implemented as a separate hardware, or may be an application program which runs in the user device 110. If the proxy server is implemented as an application, it can be a standalone application or can be provided as a module being used by another program.

The proxy server 150 may communicate with the multimedia server 200 through cellular network, wireless LAN or wire communication protocol. Specific protocol used for the communication between proxy server 150 and Multimedia server 200 does not limit the scope of invention, and provided here as an example. Generally, since the user device 100 and the multimedia server 200 are located distantly, it takes time for the packet to be communicated between the user device 100 and the multimedia server 200. That is to say, when the proxy server send a data packet 250 which may include a request of e.g. playlist or actual multimedia data to the multimedia server 200, there exists a delay for the data packet 250 to reach the multimedia server 200. Moreover, when a data packet 240 which may include a playlist or a segment of the actual multimedia data pass through the network, it also needs time to arrive at the proxy server 150. These times for the data packets 250 and 240 to be pass through the network may vary depending on the status of network, thus influencing the data rate of the packets 250 and 240.

Meanwhile, for the communication between the multimedia player 110 and the proxy server 150, there may be also some delays. However, since both of the multimedia player 110 and the proxy server 150 are running in the user device 100, the delay for communicating the packets 115 and 125 is very low compared to that of the packets 250 and 240. That is to say, the data rate of packet 115 and packet 125 is far higher than that of the packet 250 and packet 240.

In some cases, the proxy server 150 may send the data 125 to the multimedia player as soon as it receives data packet 240 from the multimedia server 200. That is, the proxy server 150 may merely redirect the packet received to the multimedia player 110.

However, in another example, the proxy server 150 may buffer data received from the multimedia server 200. Then, if a sufficient amount of data is buffered, the proxy server 150 may start to send its data to the multimedia player 110. Periodically, the proxy server 150 may check the status of the buffer, and if there is not enough data for sending to the multimedia player 110, it can suspend sending, and wait for the buffer to be filled again.

In any of the above examples, the multimedia player 110 is not aware of how the proxy server 150 and the multimedia server 200 work exactly unless there is a protocol to notify it between the multimedia player 110 and the proxy server 150.

For example, it may be supposed that the multimedia player 110 uses a multimedia streaming protocol established based on HTTP, and the proxy server 150 acts as an HTTP server. If the multimedia player 110 is programmed not to distinguish where the server it connects is located, it will function in the same way regardless of whether the server is located in the local device or not.

Sometimes, the multimedia player 110 may use heuristic algorithms to try and estimate the available bandwidth based on the data it receives. In this case, the multimedia player 110 analyzes the packet 125 and estimates the data rate of it. If the proxy server 150 sends data as much as possible to multimedia player 110 whenever the multimedia player 110 requests it, the multimedia player 110 could estimate the data rate incorrectly, e.g. higher that its actual data rate, because there can be a data burst during a short period. It is highly possible that the multimedia player estimate a higher data rate than the real data rate between the proxy server 150 and the multimedia server 200.

It may be pointed out that a goal here is to mimic the network conditions, e.g. from a WAN interface into the local interface, so that the proxy server can work in a transparent way for the multimedia player 110, i.e. not affecting the player's heuristics to estimate the available bandwidth.

According to the approach, and solving such a problem, the proxy server 150 estimates the data rate between the user device 300 and the multimedia server 200 and sends a data stream for the multimedia content to the multimedia player 200 based on the estimated data rate. There may exist various ways to estimate the data rate between the user device 100 and the multimedia player 200. If the network driver software of the user device 100 provides an average data rate through an API, the proxy server 150 may call the API to retrieve the actual network speed between the proxy server 150 and the multimedia server 200.

In another alternative embodiment, the proxy server 150 may measure data rates for a plurality of multimedia contents based on the plurality of packet 240 for the multimedia content which is received. For example, if the proxy server 150 may count the amount of data received during a specific interval, the amount and the interval may be considered to calculate the approximate data rate. The measurement for the data rate may even be performed periodically.

Once, the approximate data rate is calculated, the proxy server 150 may control its data rate of the data packets 125 between the multimedia player 110 and the proxy server 150. For example, it can reply for the request 115 from the multimedia player 110 not as soon as possible but after waiting for a duration of time to make the multimedia player 110 believe that it is communicating with a remote server. The duration of time to wait for can be determined based on the approximate data rate between the proxy server 150 and the multimedia server 200. Alternatively, the proxy server 150 may stream data 125 to the multimedia player 110 based on the approximate data rate.

How the system of the present invention takes care of the security of the downloadable DRM agent will now be discussed. Secret keys and licenses are stored in an HDS (PlayReady database). It stores all persistent information related to DRM licenses, including license keys (secrets). The database encrypts all keys stored in the HDS using keys derived from the unique device private key. The unique device private key (and certificate) is created at the run time the very first time the DRM Fusion Agent is initialized, that is to say the first time the application is run after installation. To create the device key and the certificate a model key (or application key) is used in the following procedure:

for downloadable application, the unique model key should be part of the application image;

the generated device key is stored as an encrypted file (encrypted by a key derived from the model key).

To summarize, the root of the trust key is the application or model private key. This is stored in the application image in encrypted format.

It must be noted that the DRM Fusion Agent protects the device key by using SW obfuscation technologies.

The model key is used to create a device unique key the first time the application is initialized. The device key or the certificate is used for authenticating to PlayReady servers during license acquisition. All licenses received from the server contain keys that are wrapped with other keys derived from the device unique key. Run time protection of keys is provided by anti-debugging, obfuscation.

In this respect it is also important providing a secure clock Implementation and this is obtained through:

a rollback detection of the system clock;

a synchronizing system time, with a secure network time server (e.g. provided by Microsoft), which is invoked if a user modification of a system clock is detected.

The DRM Core software library including all sensitive DRM related functions and parameters are protected by obfuscation and anti-tampering technologies.

Figure 10:
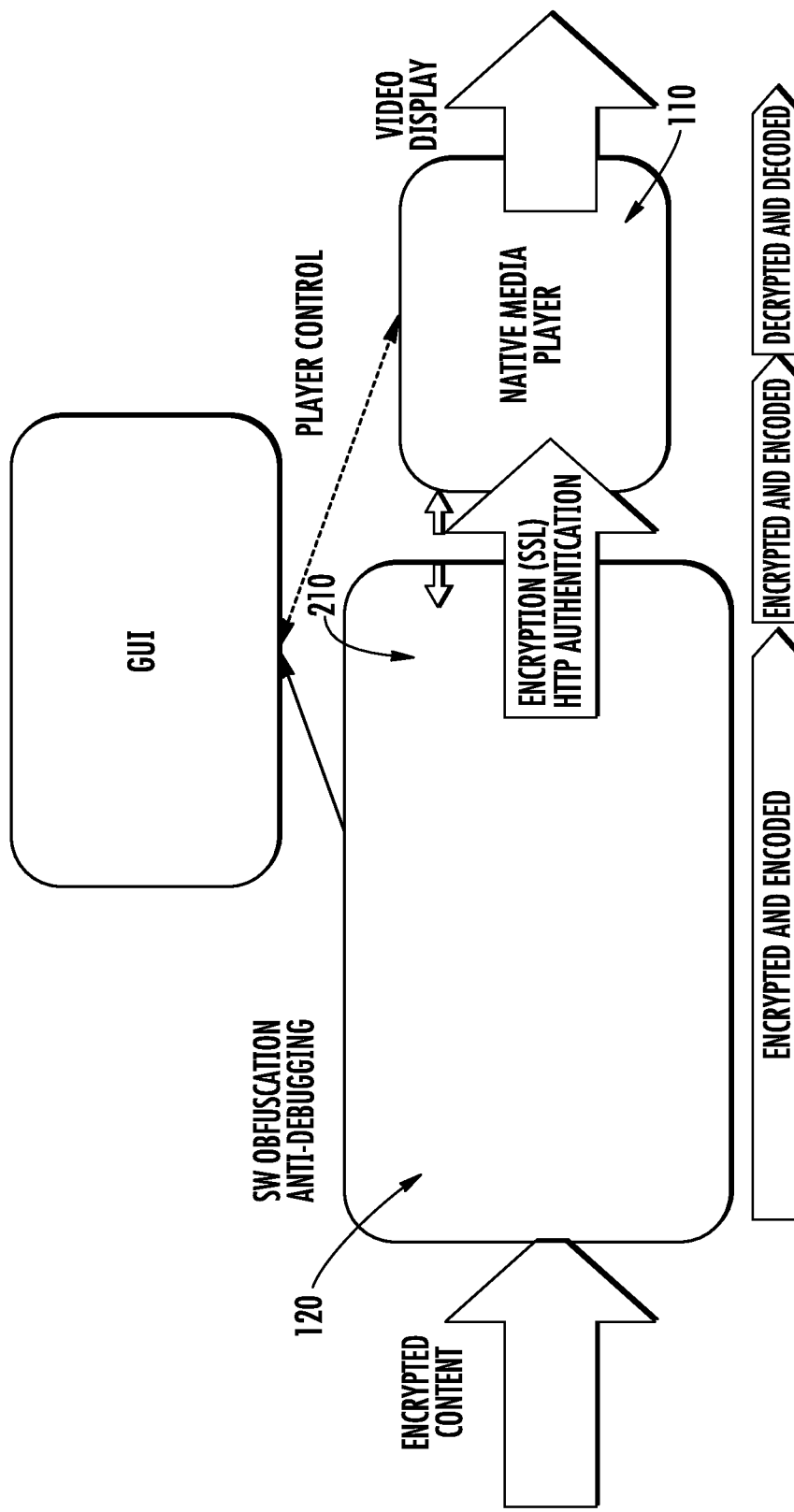
FIG. 10 is a schematic diagram illustrating some security details adopted between the user device and the multimedia server according to an aspect of the invention.

In FIG. 10 it is presented a schematic view of the integration with iOS native player including the security measures within the iOS native player. As to the media content Server 200, it should be noted that its main duties are the following: reformats the PlayReady protected media into a native player compatible HLS local stream; but decrypted data never stored on flash, and no decoding/re-encoding is applied; The media content server is started on demand only when media is ready to be displayed; Internal address invisible to external parties or other installed applications; Random listen port and media URLs are used on each playback session; HTTP authentication applied between Media Content Server and Native Player; Generated credentials are passed from the DRM Fusion Agent when launching the native media player; SSL encryption applied between Media Content Server and Native Player; The local media stream is encrypted with SSL by the media content server and decrypted by the native media player.

The SW Obfuscation, anti-debugging and anti-tampering procedure are applied by default to protect the DRM Fusion Agent software.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A method for protecting digital contents comprising:

a content delivery phase wherein a content server stores digital content or receives streaming digital content, and transmits to a user device the digital content in a protected format along with a key identification;

a key generation phase in a Digital Rights Management (DRM) server which derives at least one key without storing the key;

a key transmission phase wherein the derived key is transmitted from the DRM server to the content server for protecting the digital content;

wherein, for unlocking the digital content, the user device requests the derived key from the DRM server, the request including the key identification transmitted by the content server to the user device which is used by the DRM server to derive the key for the user device;

wherein the key generation phase is requested from a DRM batch protector module of the content server to the DRM server before encrypting the digital contents, the encryption of the digital contents being executed offline in the DRM batch protector module after receipt of the derived key from the DRM server as an encryption key; and wherein the DRM batch protector module reads the digital contents from a local directory or from a Uniform Resource Locator (URL) and retrieves the encryption key from a key file provided to the DRM batch protector module by the DRM server with password protection.

2. The method according to claim 1, wherein the derived key is used only for a single communication session between the DRM server and the content server, and then marked as used.

3. The method according to claim 1, wherein the user device consumes the derived key after accessing the protected digital content.

4. The method according to claim 1, wherein the key generation phase comprises an execution of a Simple Object Access Protocol (SOAP) Application Programming Interface (API) in the DRM server, the SOAP API having in input an identifier of the digital content to be protected and a Crypto Period Number (CPN) associated to a number of segments in which the digital contents is transmitted, and in output a plurality of keys used for protecting the digital content in the plurality of segments.

5. The method according to claim 4, wherein the DRM batch protector module of the content server transmits the CPN and the identifier of digital contents to the DRM server to obtain in response from the DRM server the plurality of keys, and wherein further keys are obtained by the DRM batch protector module transmitting an increased CPN to the DRM server.

6. The method according to claim 5, wherein the DRM batch protector module further provides to the DRM server a type of DRM protection used for protecting the digital content, the type including at least one of PlayReady, Windows Media DRM and Apple HTTP Streaming.

7. The method according to claim 1, wherein the transmission of the derived key between the DRM server and the content server is over one of a secure channel and a secure out-of-band channel.

8. The method according to claim 1, wherein the transmission of the derived key between the DRM server and the content server is password protected.

9. The method according to claim 1, wherein the transmission of protected digital content from the content server to the user device is streamed with each stream being separately encrypted before transmission.

10. The method according to claim 1, wherein the transmission of protected digital contents from the content server to the user device is in a single block stored in the content server.

11. The method according to claim 1, wherein the protected digital content is delivered to a content delivery network of the content server, being one of a web server and an edge-caching network, for subsequent delivery to the user device.

12. A system for protecting digital contents comprising:

a Digital Right Management (DRM) server computer configured to derive at least one key without storing the key; and a content server computer configured to store digital content or receive streaming digital content to be protected, and configured to receive the derived key from said DRM server computer, and configured to transmit protected digital content to a user device including a key identification, the user device configured to request the derived key from said DRM server computer for unlocking the digital content with the request including the key identification transmitted by said content server computer to the user device;

said DRM server computer configured to receive the key identification from the user device to derive the key for said user device;

said content server computer comprising a DRM batch protector module, wherein a key generation phase is requested from said DRM batch protector module to the DRM server computer before encrypting the digital contents, wherein encryption of the digital contents is executed offline in the DRM batch protector module after receipt of the derived key from the DRM server computer as an encryption key, and wherein the DRM batch protector module reads the digital contents from a local directory or from a Uniform Resource Locator (URL) and retrieves the encryption key from a key file provided to the DRM batch protector module by the DRM server computer with password protection.

13. The system according to claim 12, wherein the derived key is used only for a single communication session between said DRM server computer and said content server computer, and then marked as used.

14. The system according to claim 12, wherein the user device consumes the derived key after accessing the protected digital content.

* * * * *